(12) United States Patent
Asik et al.

(10) Patent No.: US 6,502,387 B1
(45) Date of Patent: Jan. 7, 2003

(54) METHOD AND SYSTEM FOR CONTROLLING STORAGE AND RELEASE OF EXHAUST GAS CONSTITUENTS IN AN EMISSION CONTROL DEVICE

(75) Inventors: Joseph Richard Asik, Bloomfield Hills, MI (US); Garth Michael Meyer, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/884,233

(22) Filed: Jun. 19, 2001

(51) Int. Cl.$^7$ .................................................. F01N 3/00
(52) U.S. Cl. ............................ 60/277; 60/274; 60/285; 60/276; 60/297
(58) Field of Search .......................... 60/274, 276, 285, 60/295, 297, 286

(56) References Cited

U.S. PATENT DOCUMENTS

| | | |
|---|---|---|
| 3,696,618 A | 10/1972 | Boyd et al. |
| 3,969,932 A | 7/1976 | Rieger et al. |
| 4,033,122 A | 7/1977 | Masaki et al. |
| 4,036,014 A | 7/1977 | Ariga |
| 4,167,924 A | 9/1979 | Carlson et al. |
| 4,178,883 A | 12/1979 | Herth |
| 4,186,296 A | 1/1980 | Crump, Jr. |
| 4,251,989 A | 2/1981 | Norimatsu et al. |
| 4,533,900 A | 8/1985 | Muhlberger et al. |
| 4,622,809 A | 11/1986 | Abthoff et al. |
| 4,677,955 A | 7/1987 | Takao |
| 4,854,123 A | 8/1989 | Inoue et al. |
| 4,884,066 A | 11/1989 | Miyata et al. |
| 4,913,122 A | 4/1990 | Uchida et al. |
| 4,964,272 A | 10/1990 | Kayanuma |
| 5,009,210 A | 4/1991 | Nakagawa et al. |
| 5,088,281 A | 2/1992 | Izutani et al. |

(List continued on next page.)

FOREIGN PATENT DOCUMENTS

| | | |
|---|---|---|
| DE | 196 07 151 C1 | 7/1997 |
| EP | 0 351 197 A2 | 1/1990 |
| EP | 0 444 783 A1 | 9/1991 |

(List continued on next page.)

OTHER PUBLICATIONS

C. D. De Boer et al., "Engineered Control Strategies for Improved Catalytic Control of $NO_x$ in Lean Burn Applications," SAE Technical Paper No. 881595, Oct. 10–13, 1988.

(List continued on next page.)

*Primary Examiner*—Thomas Denion
*Assistant Examiner*—Binh Tran
(74) *Attorney, Agent, or Firm*—Julia Voutyras; Allan J. Lippa

(57) ABSTRACT

A method and system are provided for adaptive control of a purge time and a fill time for an emission control device used to reduce emission of a selected constituent gas, such $NO_x$, of an engine's generated exhaust gas, with optimization and adapting of stored values to reflect changes in device operating conditions. The invention determines a present value representative of the quantity of oxygen stored in the device, as well as a present value for the maximum device $NO_x$-storage capacity to provide real-time adjustment of purge and fill time to achieve optimum overall operation of the device. The invention also periodically determines actual fill times which corresponding to optimal fill times to generate adaptive values for use during normal open-loop control.

10 Claims, 12 Drawing Sheets

U.S. PATENT DOCUMENTS

| | | |
|---|---|---|
| 5,097,700 A | 3/1992 | Nakane |
| 5,165,230 A | 11/1992 | Kayanuma et al. |
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |
| 5,272,871 A | 12/1993 | Oshima et al. |
| 5,325,664 A | 7/1994 | Seki et al. |
| 5,331,809 A | 7/1994 | Takeshima et al. |
| 5,335,538 A | 8/1994 | Blischke et al. |
| 5,357,750 A | 10/1994 | Ito et al. |
| 5,359,852 A | 11/1994 | Curran et al. |
| 5,377,484 A | 1/1995 | Shimizu |
| 5,402,641 A | 4/1995 | Katoh et al. |
| 5,410,873 A | 5/1995 | Tashiro |
| 5,412,945 A | 5/1995 | Katoh et al. |
| 5,412,946 A | 5/1995 | Oshima et al. |
| 5,414,994 A | 5/1995 | Cullen et al. |
| 5,419,122 A | 5/1995 | Tabe et al. |
| 5,423,181 A | 6/1995 | Katoh et al. |
| 5,426,934 A | 6/1995 | Hunt et al. |
| 5,433,074 A | 7/1995 | Seto et al. |
| 5,437,153 A | 8/1995 | Takeshima et al. |
| 5,448,886 A | 9/1995 | Toyoda |
| 5,448,887 A | 9/1995 | Takeshima |
| 5,450,722 A | 9/1995 | Takeshima et al. |
| 5,452,576 A | 9/1995 | Hamburg et al. |
| 5,472,673 A | 12/1995 | Goto et al. |
| 5,473,887 A | 12/1995 | Takeshima et al. |
| 5,473,890 A | 12/1995 | Takeshima et al. |
| 5,483,795 A | 1/1996 | Katoh et al. |
| 5,531,972 A | 7/1996 | Rudy |
| 5,544,482 A | 8/1996 | Matsumoto et al. |
| 5,551,231 A | 9/1996 | Tanaka et al. |
| 5,554,269 A | 9/1996 | Joseph et al. |
| 5,569,848 A | 10/1996 | Sharp |
| 5,577,382 A | 11/1996 | Kihara et al. |
| 5,595,060 A | 1/1997 | Togai et al. |
| 5,598,703 A | 2/1997 | Hamburg et al. |
| 5,617,722 A | 4/1997 | Takaku |
| 5,622,047 A | 4/1997 | Yamashita et al. |
| 5,626,014 A | 5/1997 | Hepburn et al. |
| 5,626,117 A | 5/1997 | Wright et al. |
| 5,655,363 A | 8/1997 | Ito et al. |
| 5,657,625 A | 8/1997 | Koga et al. |
| 5,693,877 A | 12/1997 | Ohsuga et al. |
| 5,713,199 A | 2/1998 | Takeshima et al. |
| 5,715,679 A | 2/1998 | Asanuma et al. |
| 5,722,236 A | 3/1998 | Cullen et al. |
| 5,724,808 A | 3/1998 | Ito et al. |
| 5,729,971 A | 3/1998 | Matsuno et al. |
| 5,732,554 A | 3/1998 | Sasaki et al. |
| 5,735,119 A | 4/1998 | Asanuma et al. |
| 5,737,917 A | 4/1998 | Nagai |
| 5,740,669 A | 4/1998 | Kinugasa et al. |
| 5,743,084 A | 4/1998 | Hepburn |
| 5,743,086 A | 4/1998 | Nagai |
| 5,746,049 A | 5/1998 | Cullen et al. |
| 5,746,052 A | 5/1998 | Kinugasa et al. |
| 5,752,492 A | 5/1998 | Kato et al. |
| 5,771,685 A | 6/1998 | Hepburn |
| 5,771,686 A | 6/1998 | Pischinger et al. |
| 5,778,666 A | 7/1998 | Cullen et al. |
| 5,792,436 A | 8/1998 | Feeley et al. |
| 5,802,843 A | 9/1998 | Kurihara et al. |
| 5,803,048 A | 9/1998 | Yano et al. |
| 5,806,306 A | 9/1998 | Okamoto et al. |
| 5,813,387 A | 9/1998 | Minowa et al. |
| 5,831,267 A | 11/1998 | Jack et al. |
| 5,832,722 A | 11/1998 | Cullen et al. |
| 5,842,339 A | 12/1998 | Bush et al. |
| 5,842,340 A | 12/1998 | Bush et al. |
| 5,862,661 A | 1/1999 | Zhang et al. |
| 5,865,027 A | 2/1999 | Hanafusa et al. |
| 5,867,983 A | 2/1999 | Otani |
| 5,877,413 A | 3/1999 | Hamburg et al. |
| 5,910,096 A | 6/1999 | Hepburn et al. |
| 5,929,320 A | 7/1999 | Yoo |
| 5,934,072 A | 8/1999 | Hirota et al. |
| 5,938,715 A | 8/1999 | Zhang et al. |
| 5,953,907 A | 9/1999 | Kato et al. |
| 5,966,930 A | 10/1999 | Hatano et al. |
| 5,970,707 A | 10/1999 | Sawada et al. |
| 5,974,788 A | 11/1999 | Hepburn et al. |
| 5,974,791 A | 11/1999 | Hirota et al. |
| 5,974,793 A | 11/1999 | Kinugasa et al. |
| 5,974,794 A | 11/1999 | Gotoh et al. |
| 5,979,161 A | 11/1999 | Hanafusa et al. |
| 5,979,404 A | 11/1999 | Minowa et al. |
| 5,983,627 A | 11/1999 | Asik |
| 5,992,142 A | 11/1999 | Pott |
| 5,996,338 A | 12/1999 | Hirota |
| 6,003,308 A | 12/1999 | Tsutsumi et al. |
| 6,012,282 A | 1/2000 | Kato et al. |
| 6,012,428 A | 1/2000 | Yano et al. |
| 6,014,859 A | 1/2000 | Yoshizaki et al. |
| 6,023,929 A | 2/2000 | Ma |
| 6,026,640 A | 2/2000 | Kato et al. |
| 6,058,700 A | 5/2000 | Yamashita et al. |
| 6,073,440 A | 6/2000 | Douta et al. |
| 6,079,204 A | 6/2000 | Sun et al. |
| 6,092,021 A | 7/2000 | Ehlbeck et al. |
| 6,092,369 A | 7/2000 | Hosogai et al. |
| 6,101,809 A | 8/2000 | Ishuzuka et al. |
| 6,102,019 A | 8/2000 | Brooks |
| 6,105,365 A | 8/2000 | Deeba et al. |
| 6,119,449 A | 9/2000 | Köler |
| 6,128,899 A | 10/2000 | Oono et al. |
| 6,134,883 A | 10/2000 | Kato et al. |
| 6,138,453 A | 10/2000 | Sawada et al. |
| 6,145,302 A | 11/2000 | Zhang et al. |
| 6,145,305 A | 11/2000 | Itou et al. |
| 6,148,611 A | 11/2000 | Sato |
| 6,148,612 A | 11/2000 | Yamashita et al. |
| 6,161,378 A | 12/2000 | Hanaoka et al. |
| 6,161,428 A | 12/2000 | Esteghlal et al. |
| 6,164,064 A | 12/2000 | Pott |
| 6,189,523 B1 | 2/2001 | Weisbrod et al. |
| 6,199,373 B1 | 3/2001 | Hepburn et al. |
| 6,202,406 B1 | 3/2001 | Griffin et al. |
| 6,205,773 B1 | 3/2001 | Suzuki |
| 6,214,207 B1 | 4/2001 | Miyata et al. |
| 6,216,448 B1 | 4/2001 | Schnaibel et al. |
| 6,216,451 B1 | 4/2001 | Schnaibel et al. |
| 6,233,923 B1 | 5/2001 | Itou et al. |
| 6,233,925 B1 * | 5/2001 | Hirota et al. .................. 60/285 |
| 6,237,330 B1 | 5/2001 | Takahashi et al. |
| 6,244,046 B1 | 6/2001 | Yamashita |
| 6,263,668 B1 * | 7/2001 | Yamashita et al. ............. 60/301 |

FOREIGN PATENT DOCUMENTS

| | | |
|---|---|---|
| EP | 0 503 882 A1 | 9/1992 |
| EP | 0 508 389 A1 | 1/1994 |
| JP | 62-97630 | 5/1987 |
| JP | 62-117620 | 5/1987 |
| JP | 64-53042 | 3/1989 |
| JP | 2-30915 | 2/1990 |

| JP | 2-33408 | 2/1990 |
| JP | 2-207159 | 8/1990 |
| JP | 3-135147 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| WO | WO 98/27322 | 6/1998 |

OTHER PUBLICATIONS

Y. Kaneko et al., "Effect of Air–Fuel Ratio Modulation on Conversion Efficiency of Three–Way Catalysts," SAE Technical Paper No. 780607, Jun. 5–9, 1978, p. 119–127.

W. H. Holl, "Air–Fuel Control to Reduce Emissions I. Engine–Emissions Relationships," SAE Technical Paper No. 800051, Feb. 25–29, 1980.

A. H. Meitzler, "Application of Exhaust–Gas–Oxygen Sensors to the Study of Storage Effects in Automotive Three–Way Catalysts," SAE Technical Paper No. 800019, Feb. 25–29, 1980.

J. Theis et al., "An Air/Fuel Algorithm to Improve the $NO_x$ Conversion of Copper–Based Catalysts," SAE Technical Paper No. 922251, Oct. 19–22, 1992.

W. Wang, "Air–Fuel Control to Reduce Emissions, II. Engine–Catalyst Characterization Under Cyclic Conditions," SAE Technical Paper No. 800052, Feb. 25–29, 1980.

T. Yamamoto et al., "Dynamic Behavior Analysis of Three Way Catalytic Reaction," JSAE 882072—882166.

* cited by examiner

METHOD AND SYSTEM FOR CONTROLLING STORAGE AND RELEASE OF EXHAUST GAS CONSTITUENTS IN AN EMISSION CONTROL DEVICE

BACKGROUND OF THE INVENTION

1. Field of the Invention

The invention relates to vehicle emission control devices which store a constituent gas of the engine-generated exhaust gas during a first engine operating condition and which release previously-stored constituent gas during a second engine operating condition.

2. Background Art

Generally, the operation of a vehicle's internal combustion engine produces engine exhaust that includes a variety of constituent gases, including carbon monoxide (CO), hydrocarbons (HC), and nitrogen oxides ($NO_x$). The rates at which the engine generates these constituent gases are dependent upon a variety of factors, such as engine operating speed and load, engine temperature, spark timing, and EGR. Moreover, such engines often generate increased levels of one or more constituent gases, such as $NO_x$, when the engine is operated in a lean-burn cycle, i.e., when engine operation includes engine operating conditions characterized by a ratio of intake air to injected fuel that is greater than the stoichiometric air-fuel ratio, for example, to achieve greater vehicle fuel economy.

In order to control these vehicle tailpipe emissions, the prior art teaches vehicle exhaust treatment systems that employ one or more three-way catalysts, also referred to as emission control devices, in an exhaust passage to store and release select constituent gases, such as $NO_x$, depending upon engine operating conditions. For example, U.S. Pat. No. 5,437,153 teaches an emission control device which stores exhaust gas $NO_x$ when the exhaust gas is lean, and releases previously-stored $NO_x$ when the exhaust gas is either stoichiometric or "rich" of stoichiometric, i.e., when the ratio of intake air to injected fuel is at or below the stoichiometric air-fuel ratio. Such systems often employ open-loop control of device storage and release times (also respectively known as device "fill" and "purge" times) so as to maximize the benefits of increased fuel efficiency obtained through lean engine operation without concomitantly increasing tailpipe emissions as the device becomes "filled." The timing of each purge event must be controlled so that the device does not otherwise exceed its $NO_x$ storage capacity, because $NO_x$ would then pass through the device and effect an increase in tailpipe $NO_x$ emissions. The frequency of the purge is preferably controlled to avoid the purging of only partially filled devices, due to the fuel penalty associated with the purge event's enriched air-fuel mixture.

The prior art has recognized that the storage capacity of a given emission control device is itself a function of many variables, including device temperature, device history, sulfation level, and the presence of any thermal damage to the device. Moreover, as the device approaches its maximum capacity, the prior art teaches that the incremental rate at which the device continues to store the selected constituent gas may begin to fall. Accordingly, U.S. Pat. No. 5,437,153 teaches use of a nominal $NO_x$-storage capacity for its disclosed device which is significantly less than the actual $NO_x$-storage capacity of the device, to thereby provide the device with a perfect instantaneous $NO_x$-storing efficiency, that is, so that the device is able to store all engine-generated $NO_x$ as long as the cumulative stored $NO_x$ remains below this nominal capacity. A purge event is scheduled to rejuvenate the device whenever accumulated estimates of engine-generated $NO_x$ reach the device's nominal capacity. Unfortunately, however, the use of such a fixed device capacity necessarily requires a larger device, because this prior art approach relies upon a partial, e.g., fifty-percent $NO_x$ fill in order to ensure retention of all engine-generated $NO_x$.

SUMMARY OF THE INVENTION

It is an object of the invention to provide a method and system by which to optimize the operation of a vehicle emission control device through improved open-loop control of device fill and purge events.

Under the invention, a method and system is provided for controlling a fill time cycle and a purge time cycle of an emission control device that receives exhaust gas generated by an internal combustion engine, wherein the device is filled with a constituent gas of the exhaust gas during a first engine operating condition and is purged of constituent gas during a second engine operating condition. The method includes selecting, in a normal open-loop mode of operation, a fill time and a purge time from a set of predetermined values as a function of an engine operating condition; and cyclically filling and purging the device based on the selected fill and purge times. The method further includes determining, after a predetermined number of fill and purge cycles, a first value representative of current total device capacity to store the constituent gas, and a second value representative of a quantity of oxygen stored in the device; and updating at least one of the predetermined values as a function of the first and second values. Preferably, the selected purge time is optimized only upon operation of the engine at an operating point corresponding to a limited number of engine operating conditions.

In accordance with a feature of the invention, an exemplary method includes periodically optimizing a selected purge time associated with a selected fill time by filling the device for the selected fill time; purging the device for the selected purge time; generating a third value representative of oxygen concentration present in the exhaust flowing through the device during a predetermined sampling period which includes at least an end portion of the purge time, for example, using an oxygen sensor; comparing the third value to a predetermined reference value, wherein the reference value is based on an optimized value for device capacity utilization; and generating an adaption value for modifying the selected purge time as a function of any error between the third value and the reference value.

By way of example only, in an exemplary method for practicing the invention, the step of determining the first value representative of current total device capacity includes filling the device to a saturation level; generating a fourth value representative of an oxygen concentration present in the exhaust flowing through the device; generating a first error value as a function of the fourth value and a predetermined reference value; and determining an actual purge time necessary to purge the device when the device is filled to the saturation level using the first error value. Similarly, in an exemplary method, the step of determining the second value includes, in sequence, partially filling and purging the device to a first sub-optimal level and a second sub-optimal level over different time periods; and for each sub-optimal filling and purging, generating respective values representative of the oxygen concentration in the exhaust passing through the device. The step of determining the second value in the exemplary method further includes generating respective error values based on the sub-optimal fill oxygen-concentration values, and a predetermined reference value; and determining a respective actual purge time necessary to purge the device for each sub-optimal fill based on the respective error values, whereupon the desired second value is determined as a function of the sub-optimal fill times and the actual purge times.

In accordance with another feature of the invention, in an exemplary method, the adaption value is generated as a function of either the generated third value if the third value is not greater than the reference value, and the adaption value is generated as a function of a length of time that the third value exceeds the reference value if the third value exceeds the reference value. In this exemplary method, the step of generating the adaption value further includes linearly extrapolating the third value in proportion to the measured oxygen level when the generated value is below the reference value.

From the foregoing, it will be appreciated that, under the invention, a method and system are provided for controlling the filling and purging of an emission control device used to reduce vehicle tailpipe emissions of a constituent gas, includes operating in a normal open-loop mode by determining fill times and purge times based on engine operating conditions and corresponding values stored in a memory, while periodically optimizing a purge time associated with a selected fill time. After a predetermined number of fill and purge cycles have been performed, a first value is determined which is representative of current total device capacity, and a second value is determined which is representative of a quantity of oxygen stored in the device. At least one purge time value is updated as a function of the first and second values.

Thus, the invention provides an open-loop system and method for controlling the filling and purging of an emission control device in which a more accurate open-loop determination of the device's instantaneous capacity to store constituent gas of the engine-generated exhaust gas is obtained through periodic adaption of open-loop values in response to a determination of a purge time associated with oxygen stored within the device during lean engine operation, and of a device saturation purge time. The resulting adapted open-loop values for device fill and purge times provide improved control of tailpipe emissions while further operating to minimize fuel consumption associated with purging of the device.

The above object and other objects, features, and advantages of the invention are readily apparent from the following detailed description of the best mode for carrying out the invention when taken in connection with the accompanying drawings.

DETAILED DESCRIPTION OF THE PREFERRED EMBODIMENT

Figure 1:
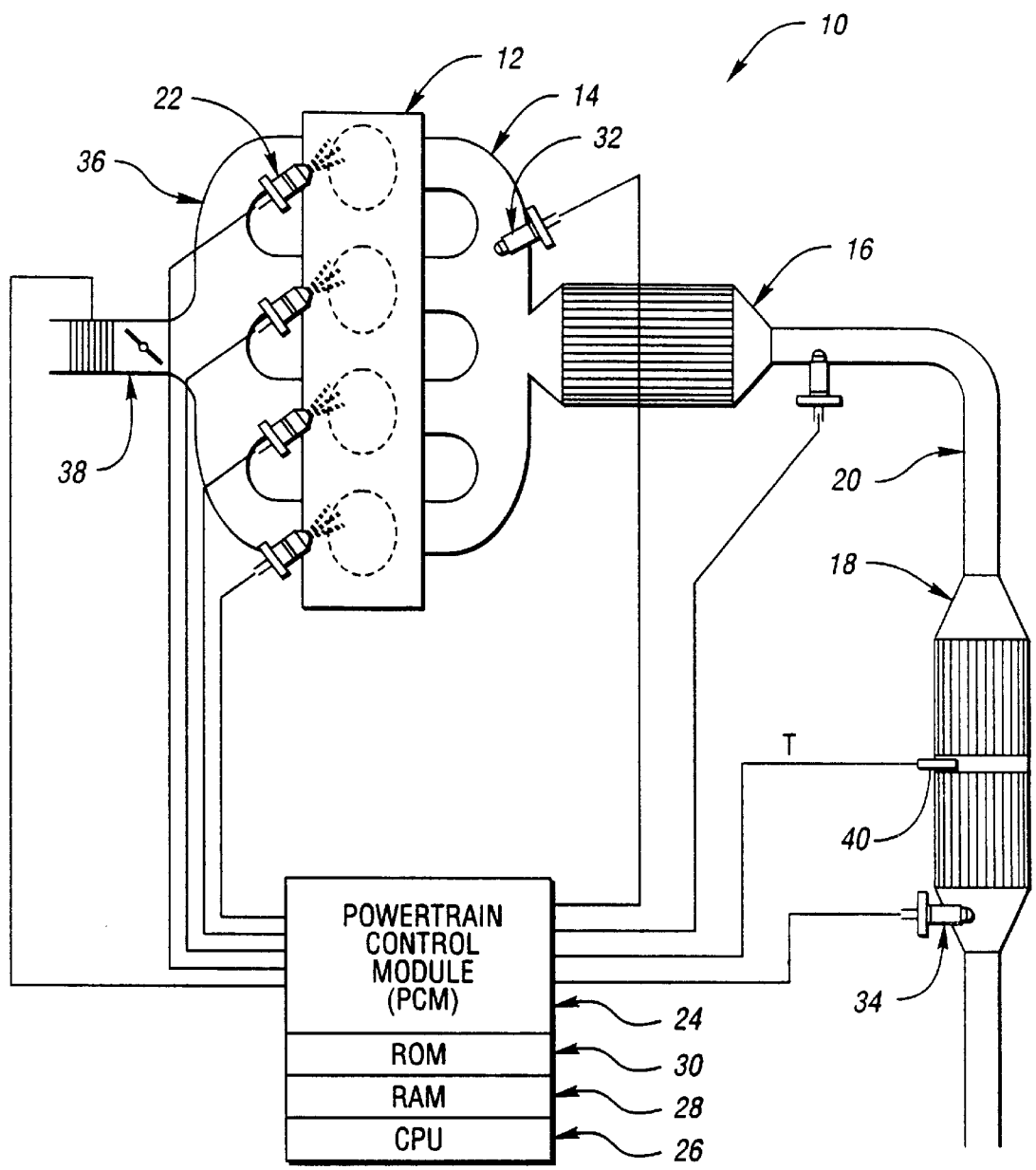
FIG. 1 shows a schematic view of a lean-burn exhaust system in a four-cylinder engine accordance with the invention.

Referring to FIG. 1, a lean burn engine exhaust system 10 in accordance with the invention includes an engine 12 having a conventional exhaust manifold 14 coupled thereto, a first, upstream catalytic emission control device 16 receiving exhaust gas from the exhaust manifold 14, and a second, downstream catalytic emission control device 18 coupled to the upstream device 16 by an exhaust pipe 20. At least one fuel injector 22 delivers fuel to the engine 12 during operation thereof. While four such injectors are shown, this is not to be construed as limiting. A fuel injection controller in the form of a powertrain control module (PCM) 24 controls operation of the fuel injector(s) 22 in accordance with any conventional fuel control algorithm strategy such as proportional integral (PI) with jump and ramp, proportional integral differential (PID), or equivalent. PCM 24 includes a central processor unit (CPU) 26, and associated RAM 28 and ROM 30 memory.

Figure 2:
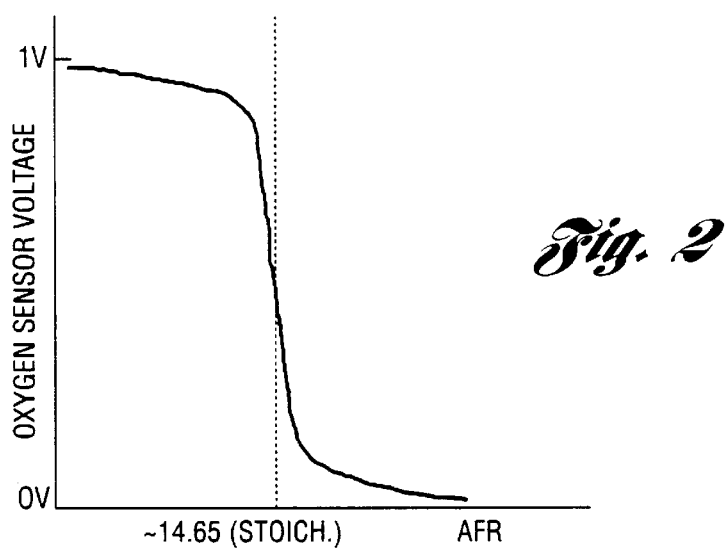
FIG. 2 shows a typical voltage vs. air-fuel ratio response for an oxygen sensor.

A first oxygen sensor 32 is coupled to the exhaust manifold 14 and PCM 24 for controlling the air-fuel ratio of the engine exhaust during normal operation of engine 12. As discussed in more detail below, a closed-loop air-fuel ratio control is provided by connecting PCM 24 to a second oxygen sensor 34 coupled to the downstream device 18 for controlling air-fuel ratio and adapting various device purge parameters during operation of the engine. The second oxygen sensor 34 is preferably positioned in the exhaust output portion of the downstream device 18 so as to provide an accurate measurement of the air-fuel ratio exiting the device 18. A temperature sensor 42, preferably located at a mid-point within the downstream device 18, generates an output signal representative of the instantaneous temperature T of the device 18. In a constructed embodiment, the first and second oxygen sensors 32,34 are "switching" heated exhaust gas oxygen (HEGO) sensors; however, the invention contemplates use of other suitable sensors for generating a signal representative of the oxygen concentration in the exhaust manifold 14 and exiting the downstream device 18, respectively, including but not limited to exhaust gas oxygen (EGO) type sensors, and linear-type sensors such as universal exhaust gas oxygen (UEGO) sensors. A typical voltage versus air-fuel ratio response for a HEGO sensor is shown in FIG. 2.

An alternative lean burn engine exhaust system could be employed utilizing a split exhaust design having two separate exhaust manifolds respectively coupled to an associated three-way catalyst. Individual exhaust manifold oxygen sensors would be provided for non-lean burn operation. In both the single and split exhaust design, air is input through an intake manifold 36 under control of a throttle 38.

During lean operation of the engine, at least one constituent gas of the engine generated exhaust, such as $NO_x$, passes through the upstream device 16 and is stored in the downstream device 18. This portion of operation is referred to as the "fill time $t_F$" for the downstream device 18. As described in more detail below, device fill time $t_F$ is initially controlled in an open-loop manner using predetermined nominal values for device purge time $t_P$ and device fill time $t_F$ stored in ROM 30. These predetermined nominal values are subsequently adapted to adjust the device fill and purge operation to changing device conditions during the life of the vehicle.

Oxygen sensor 32 is used for control of the engine air-fuel, especially during any stoichiometric operation, while oxygen sensor 34 is used for diagnosis of the downstream device 18, and determination of actual in-operation values of $t_P$ for $NO_x$ ($t_{P_{NOx}}*$), $t_P$ for oxygen mass ($t_{P_{osc}}*$), and $t_F*$. Determination of these in-operation or "learned" values allows closed-loop adaption of the predetermined nominal values in accordance with the invention. These learned adaptive values are also compared to respective threshold values to allow the CPU to assess the degree of device deterioration. If deterioration is severe enough, a device regeneration cycle featuring, for example, a device desulfation event, is scheduled; or a warning is activated to indicate that the downstream device 18 requires servicing or replacement.

Figure 9:
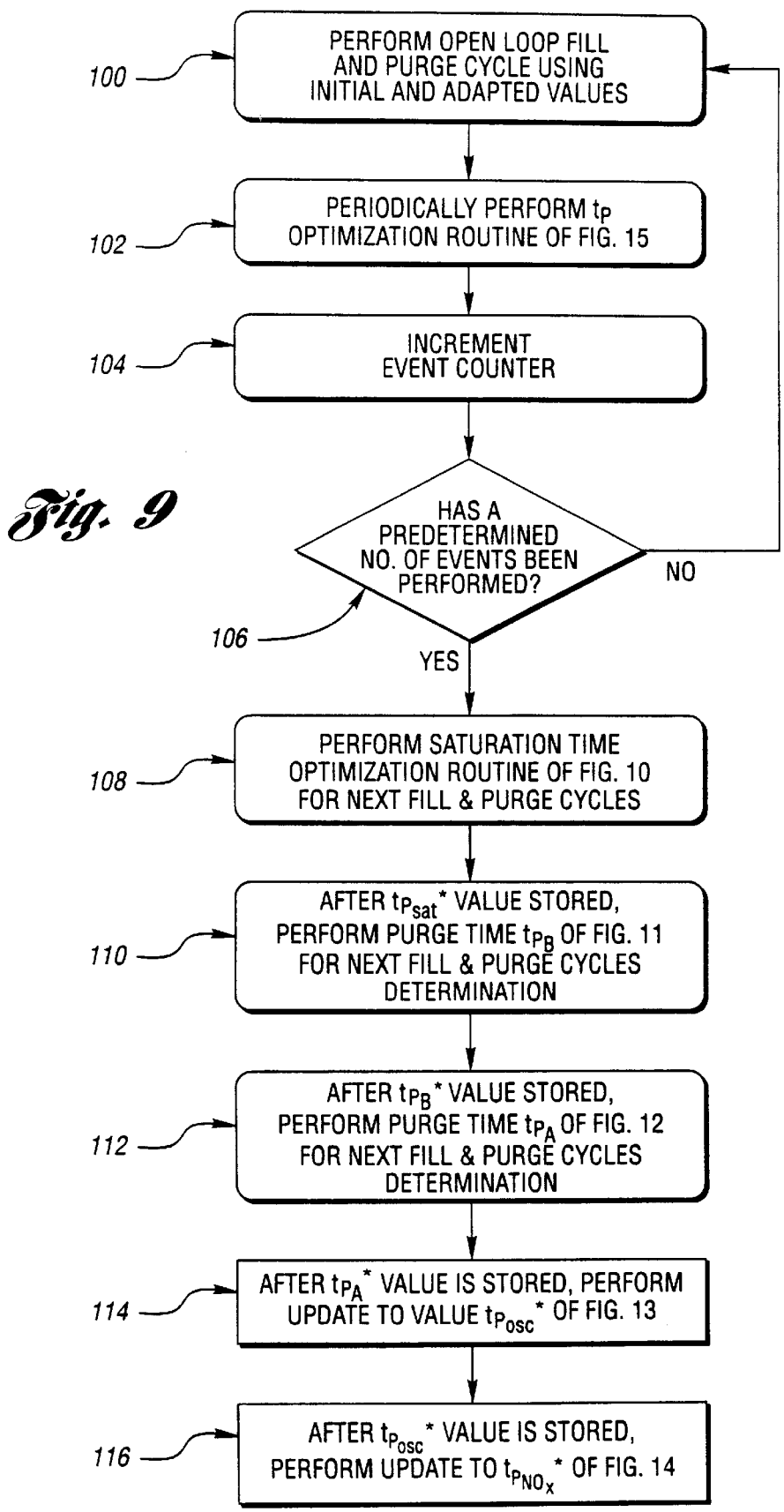
FIG. 9 is a flowchart showing overall system optimization for purge time $t_P$ and fill time $t_F$ in accordance with the invention.

FIG. 9 provides a flowchart illustrating an exemplary device control process in accordance with the invention. As denoted at block 100, normal control is open-loop for both fill and purge cycles using the initial and/or learned values for fill and purge time. The nominal value for purge time $t_P(i,j)$ is set to a fixed percentage of the nominal device saturation value $t_{P_{sat}}$, such as 80%.

As denoted at block 102, the values for $t_P$ are periodically optimized in accordance with the optimization routine shown in FIG. 15 and described more fully below. This optimization process allows values for $t_F$ to be adapted as well. A running counter is incremented at block 104 after every device event is performed to provide a mechanism for monitoring the length of time the engine has been in operation. A device event can be each individual fill or purge cycle, or a pair of corresponding fill and purge cycles.

At block 106, the control processor determines whether a predetermined number of events has occurred. The predetermined number is set to a large number so that the optimization routine of FIG. 15 is performed many times at a substantially steady state condition before a yes decision is generated at block 106. For example, the predetermined number can be between 1,000–10,000 events.

Figure 10:
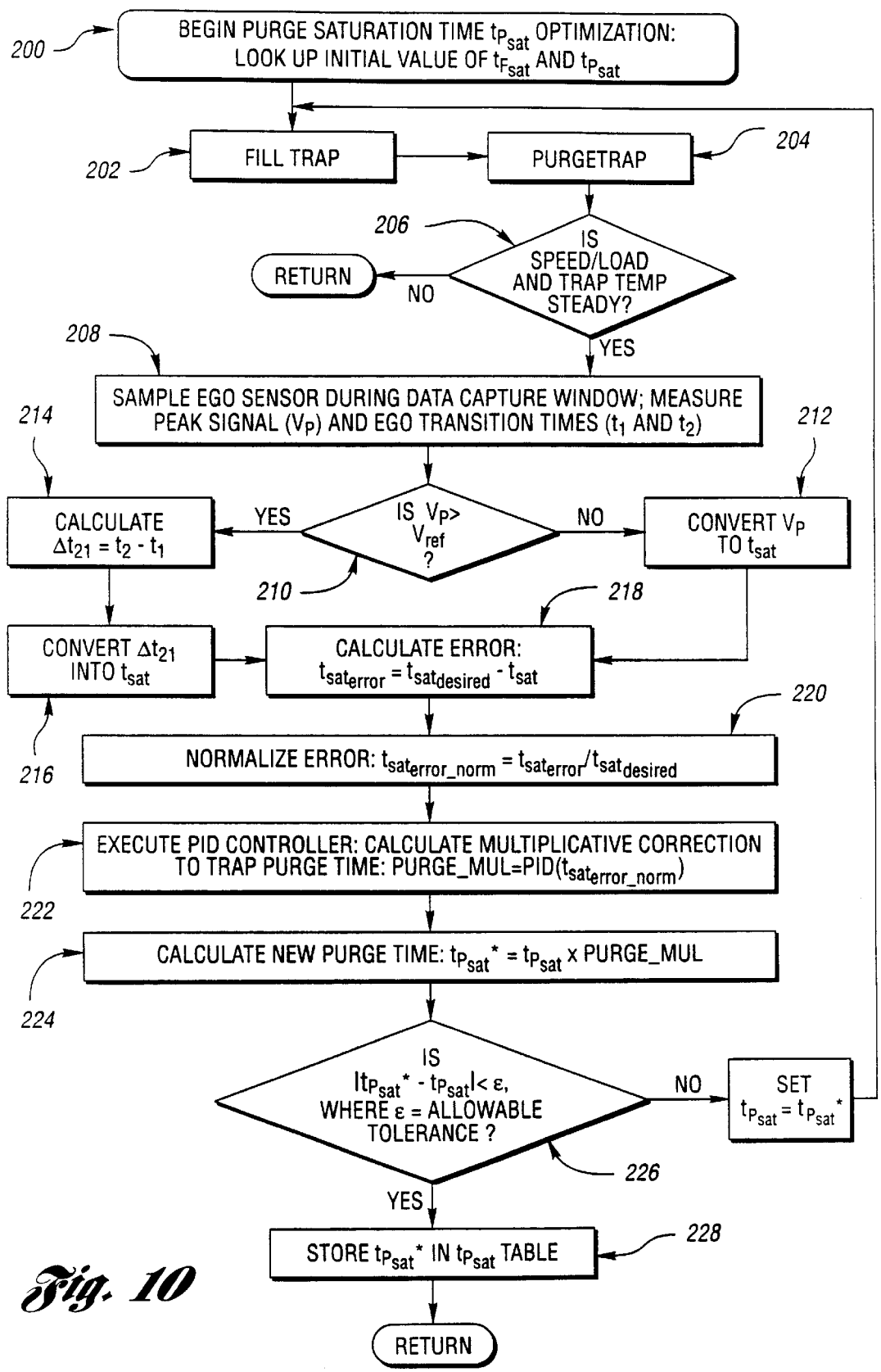
FIG. 10 is a flowchart showing a saturation purge time optimization routine in accordance with the invention.
Figure 11:
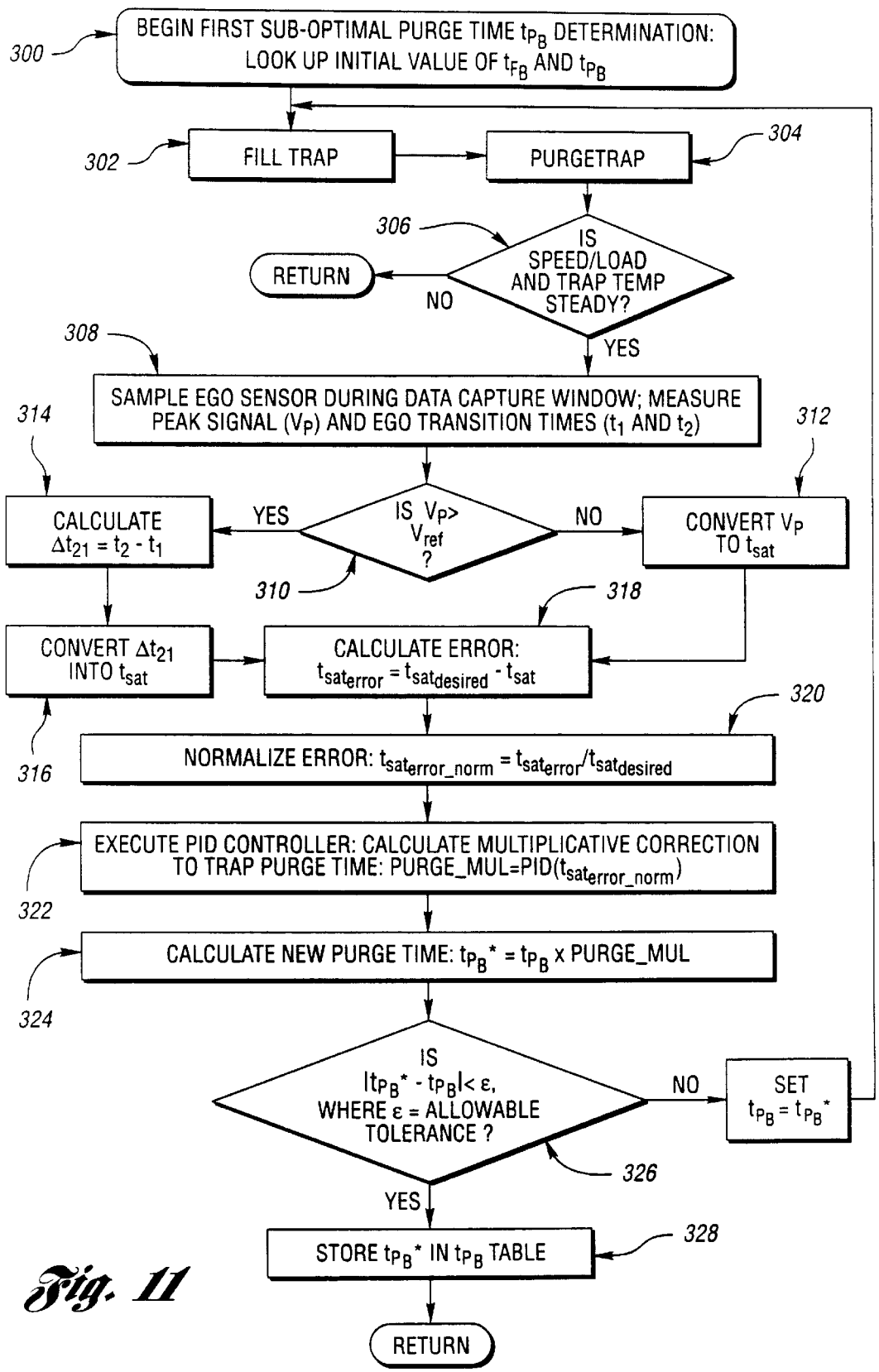
FIG. 11 is a flowchart showing a point B purge time determination routine in accordance with the invention.

If the predetermined number of events has occurred, a saturation purge time optimization routine is performed as indicated at block 108. This routine is shown in FIG. 10, and as described in more detail below, produces a new value for $t_{P_{sat}}*$. After the new $t_{P_{sat}}*$ value is stored, a first sub-optimal purge time $t_{P_B}$ determination routine is performed at block 110. This routine is shown in FIG. 11, and as also described below, produces a new value for $t_{P_B}*$. After the new $t_{P_B}*$ value is stored, a second sub-optimal purge time determination routine is performed at block 112. This routine is similar to that for first sub-optimal purge time and is described below in connection with FIG. 12. This routine likewise produces a new purge time value $t_{P_A}*$.

It is noted that the order of performing blocks 108–112 is not critical to the invention, and the sequence shown is only for illustrative purposes. However, performing all three routines within a small number of events of each other improves the reliability of the results.

After the new value for $t_{P_A}*$ is stored, a new value for $t_{P_{osc}}*$ is determined at block 114 as described below in context with FIG. 13. Then, as denoted at block 116, a new value for $t_{P_{NOx}}*$ is determined as a function of $t_{P_{sat}}*$ and $t_{P_{osc}}*$. This operation is described below in context with FIG. 14. Each of these values constitute learned values which optimize device performance to changing physical conditions during the life of the device.

Figure 3:
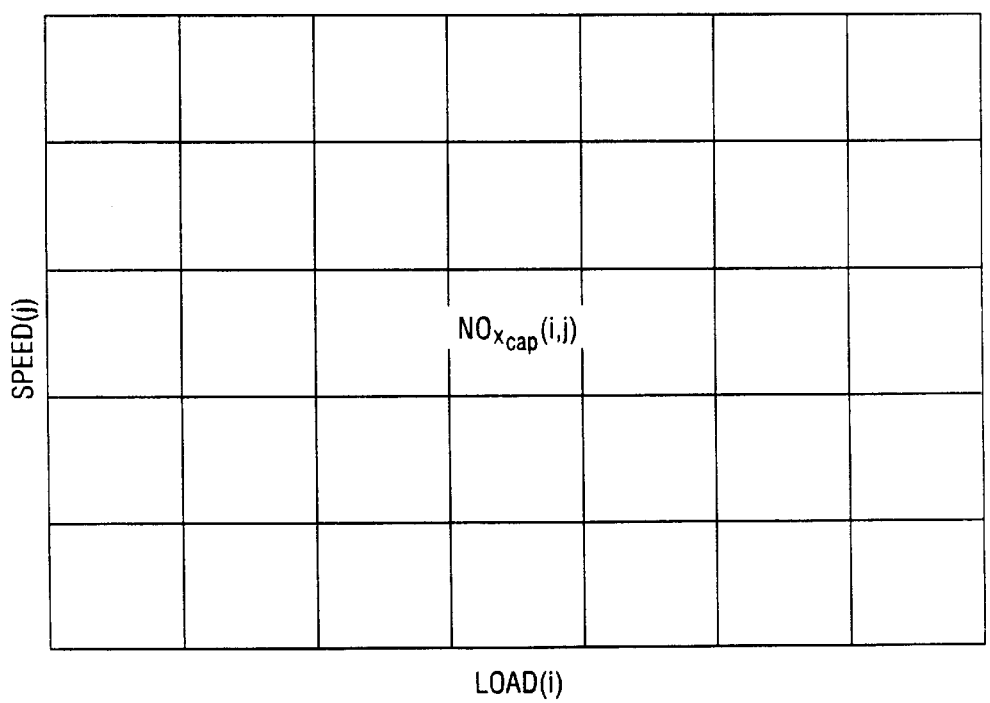
FIG. 3 is a representation of an exemplary lookup map used to store initial and learned values in accordance with a preferred embodiment of the invention.

A more detailed explanation of the invention will now be made in connection with FIGS. 3–8, and 10–15. In accordance with the invention, engine operating conditions are classified in a matrix of cells as a function of engine load (i) and engine speed (j). Nominal values for device fill time $t_F(i,j)$ are provided on a cell by cell basis. More specifically, an initial device $NO_x$ capacity $NO_{x_{cap}}(i,j)$ is predetermined for a cell from a lookup map of such values as represented in FIG. 3. It is noted that all values, whether initial/nominal values, or learned adaptive values are preferably stored in similar i/j lookup table as shown in FIG. 3. Thus, the $NO_x$ generation rate $NO_{x_{gen}}(i,j)$ for a cell is determined from a corresponding lookup table. The nominal value for a cell's device fill time is then determined as follows:

$$t_F(i, j) = \frac{NO_{x_{cap}}(i, j)}{NO_{x_{gen}}(i, j)}$$

These nominal values for $t_F(i,j)$ are also stored in a corresponding lookup table.

As noted above, the nominal cell values for fill time are adapted to adjust for changes in device operating conditions during operation of the engine. Adaptive factors K(i,j) are learned during the closed-loop feedback control of the purge and fill times as described below in context with FIG. 15. These adaptive factors are stored in a corresponding lookup table and are used to adapt nominal values for both fill time $t_F$ and purge time $t_P$.

However, such adaptive factors are only selectively updated or applied as corrective measures if a certain level of reliability has been attained. More specifically, if PCM 24 determines that operation of the engine was confined to a single cell (i,j) or a small cluster of adjacent cells prior to a purge event, then reliability of the adaptive process is satisfied. Once reliability is satisfied, actual fill time $t_F*(i,j)$ can be determined from closed-loop purge and fill control, and compared with the nominal fill time value $t_F(i,j)$. When $t_F*(i,j) < t_F(i,j) - \epsilon$, where $\epsilon$ is a predetermined tolerance, $NO_x$ capacity $NO_{x_{cap}}(i,j)$ of the cell (i,j) has deteriorated. Adaptive compensation is provided by choosing:

$$K(i, j) = \frac{p \times |t_F^*(i, j) - t_F(i, j)|}{t_F(i, j)}$$

where p is a gain constant between 0 and 1, and the cell values for K(i,j) are initially set equal to 1.0. As each cell is compensated, the stored mapping of each adaptive factor is updated as the engine is subsequently operated in the corresponding cell. Otherwise, if operation was not confined to a single cell or adjacent cluster of cells, reliability has not been satisfied and PCM 24 will not consider any correspondingly generated adaptive values as being reliable. In this situation, PCM 24 will continue to use the nominal values, or apply only the most recent reliably generated adaptive factors.

During normal device control cycles, actual fill time $t_F^*(i,j)$ can be determined during transient operation, i.e., operation of the engine across different cells during a single cycle, by utilizing the known adaptive factor K(i,j), and corresponding nominal values for fill time $t_F$ for each cell in which operation occurred. More specifically, the $NO_x$ capacity remaining after operating in a particular cell for a period of time t(i,j) is given by:

$$NOx_{cap\_avail} = K(i,j)NOx_{cap}(i,j) - NOx_{gen}(i,j) \times t(i,j),$$

Since the engine operating point moves from cell to cell during transient operation of the engine, the $NO_x$ capacity remaining after moving through several cells is given by:

$$NOx_{cap} = \sum_{i=1,j=1}^{n,m} (K(i,j)NOx_{cap}(i,j) - K(i,j)NOx_{gen}(i,j) \times t(i,j)).$$

When $NO_{x_{cap\_avail}} = q$, where q represents a desired reserve $NO_x$ capacity, a purge event is scheduled.

The total purge time $t_P(i,j)$, in a given cell, is given by:

$$t_P(i,j) = t_{P_{NOx}}(i,j) \times K + t_{P_{osc}}^*(i,j),$$

where $t_{P_{NOx}}$ is either the mass of fuel or amount of time required to purge the stored $NO_x$, and $t_{P_{osc}}^*$ is either the actual mass of fuel or the amount of time required to purge oxygen stored in the device. The following description explains how these two components of the total purge time are determined. Nominal values for $t_{P_{NOx}}$ are stored in a corresponding lookup table.

The mass of oxygen stored during a fill event is given by OSC (gm). In many known catalytic emission control devices, oxygen is typically stored as one of the oxides of cerium as a function of engine speed and load. Oxygen can also be stored as a precious metal oxide. The stored-oxygen purge time $t_{P_{osc}}(i,j)$ (sec) for a given cell (i,j) is determined as described below in connection with FIG. 13. Nominal values for total purge time $t_P$ and stored-oxygen purge time $t_{P_{osc}}$ are derived from a lookup table.

Figure 4A:
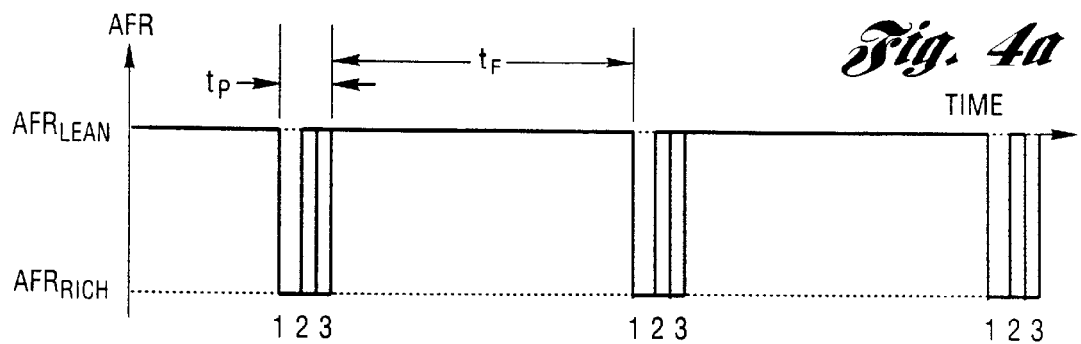
FIGS. 4(a)–(d) show plots of associated responses of engine air-fuel ratio, oxygen sensor response, tailpipe CO during a short, medium and long purge time cycle, and the associated data capture window.
Figure 4B:
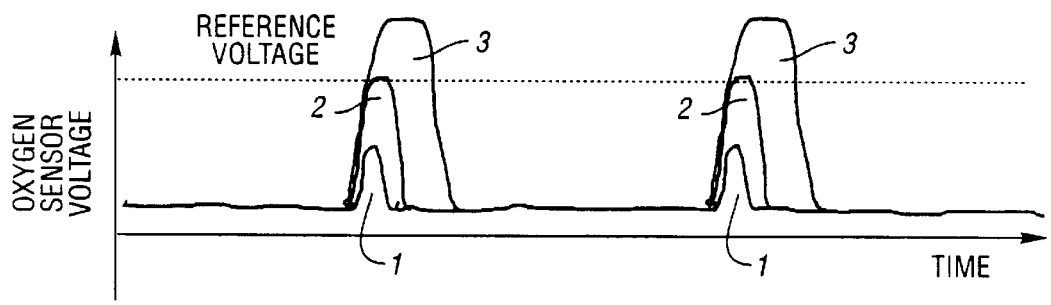
Figure 4C:
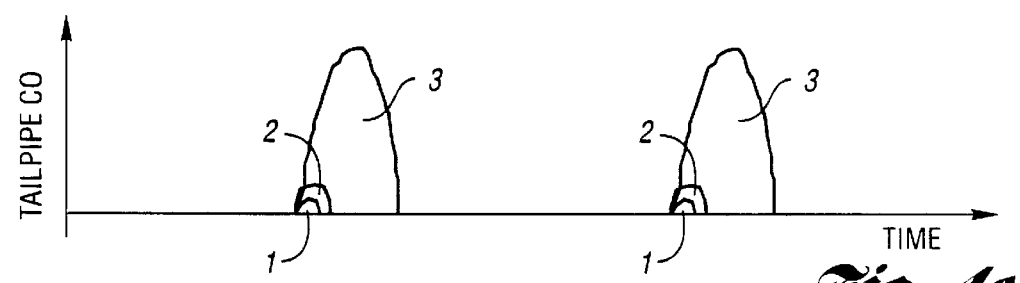

A description of the in-use purge and fill time optimization routines of the invention will now be made in connection with FIGS. 4–8 and 10–15. For purposes of understanding the invention, system responses exhibited during three different lengths of the device purge time are shown in FIGS. 4(a)–(c). More specifically, FIG. 4(a) shows the relationship of lean fill time $t_F$ and rich purge time $t_P$ for three different purge times of short (1), medium (2), and long (3) duration. The corresponding response of oxygen sensor 34 is shown in FIG. 4(b) for the same three purge times. As can be seen, a small purge time (1) produces a very small oxygen sensor response as a result of the device not being fully purged of $NO_x$ and still having a considerable amount of residual $NO_x$ stored therein. For a short purge time, the peak sensor voltage will not reach a reference voltage $V_{ref}$. For a moderate, or optimum, purge time (2), the oxygen sensor response equals the reference voltage $V_{ref}$ indicating that the device has been adequately purged. For a long purge time (3), the oxygen sensor peak voltage $V_P$ exceeds the reference voltage $V_{ref}$, indicating that the device has been over purged, thereby undesirably generating excessive tailpipe CO as shown in FIG. 4(c).

Figure 4D:
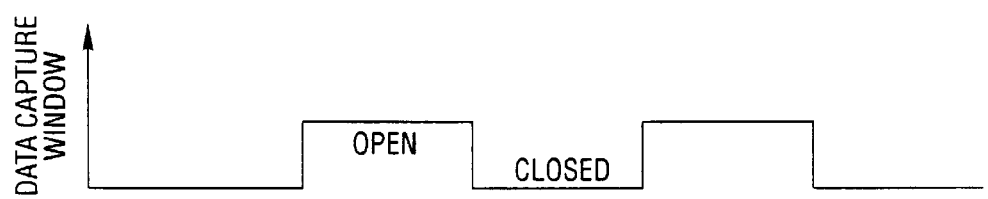
Figure 5:
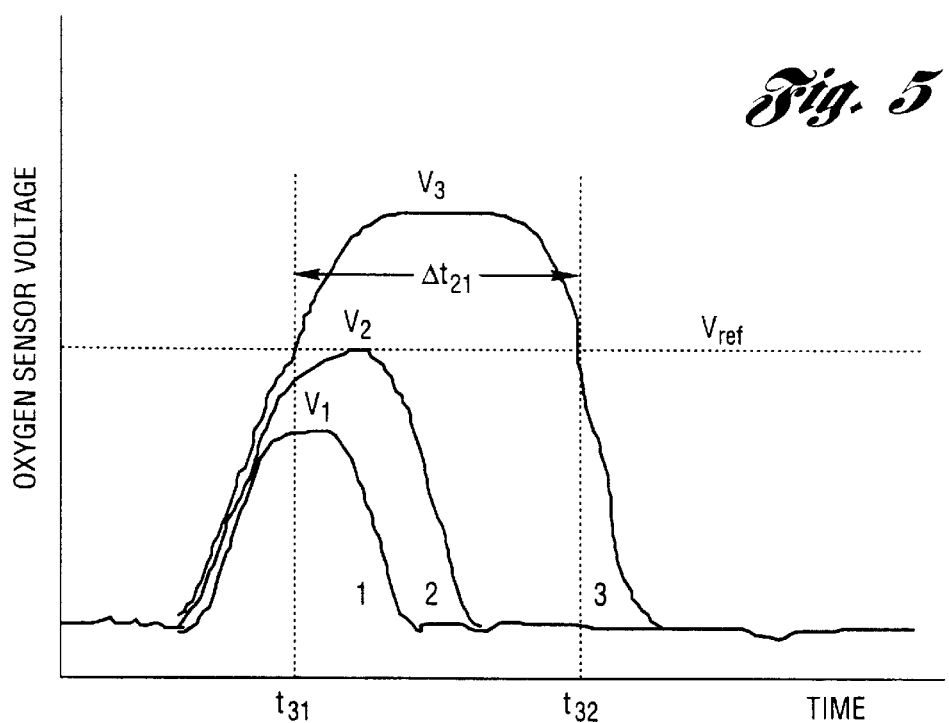
FIG. 5 shows an enlarged view of the response of the tailpipe oxygen sensor to the three levels of purge time shown in FIG. 4(c)

Referring more specifically to FIGS. 4(c) and 5, a data capture window (shown in FIG. 4(d)) for sampling the output voltage of the downstream oxygen sensor 34 is timed relative to the purge event such that for short purge time(1), very little CO passes through the device into the tailpipe and thus produces a small output response. Thus, the invention uses the peak voltage level and its duration above a threshold voltage of the downstream oxygen sensor 34 as an indicator of the quantity of $NO_x$ still stored in the downstream device 18. FIG. 5 shows an enlarged view of the response of the downstream oxygen sensor 34 to the three levels of purge time shown in FIG. 4(c). FIG. 5 illustrates a saturation time $\Delta t_{21}$ for a situation where the $v > V_{ref}$.

Figure 6:
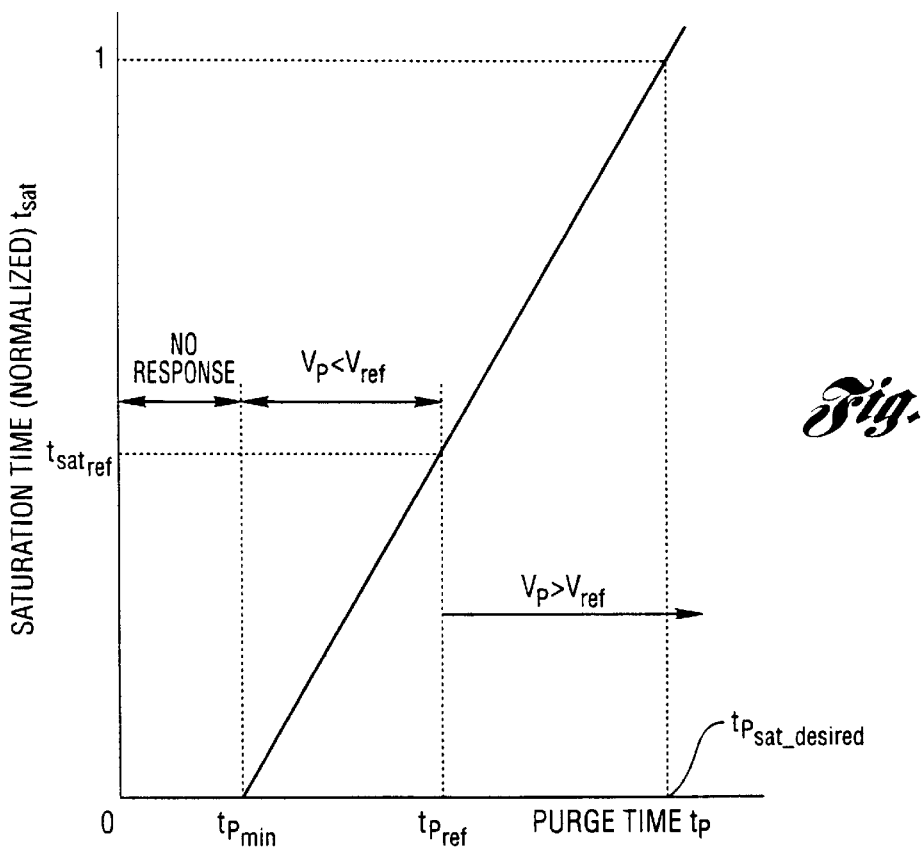
FIG. 6 shows a plot of normalized oxygen sensor saturation time $t_{sat}$ as a function of purge time $t_P$.
Figure 7:
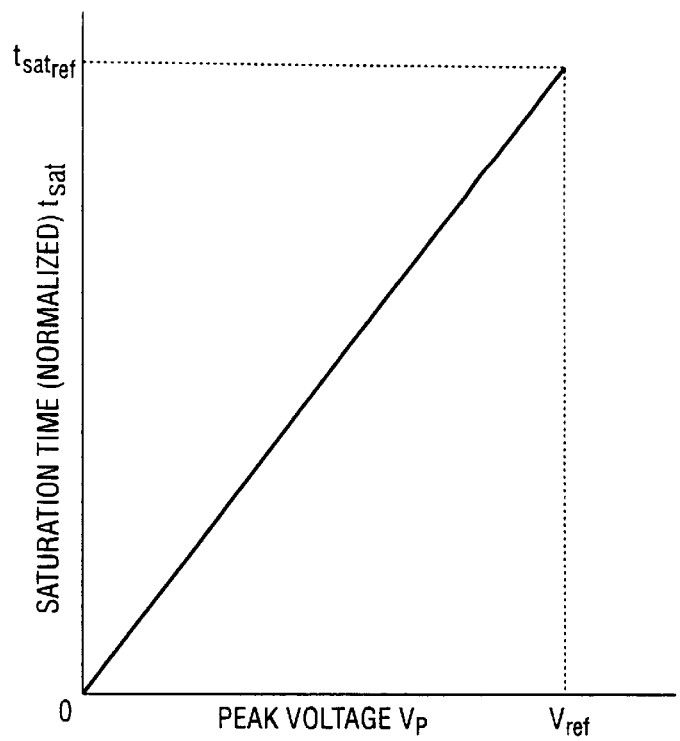
FIG. 7 shows a plot of normalized saturation time $t_{sat}$ versus oxygen sensor peak voltage $V_P$ when the peak voltage $V_P$ is less than a reference voltage $V_{ref}$.

FIG. 6 shows an extrapolated relationship between a normalized oxygen sensor saturation time $t_{sat}$ and the purge time $t_P$. The plot show three regions for a given fill time $t_F$ and operative state of the downstream device 18, the first region being defined by V=0 (no response from the HEGO sensor 34); the second region being defined by $V < V_{ref}$ (lean response from HEGO sensor 34); and the third region being defined by $V >= V_{ref}$ (a rich response from HEGO sensor 34). Purge time $t_{P_{ref}}$ results in a saturation time $t_{sat_{ref}}$, which is the minimum normalized time resolution for the system (as normalized by $t_{sat}$ desired). A purge time $t_{P_{min}}$ or less results in a zero value for saturation time $t_{sat}$. A purge time of $t_{P_{sat\_desired}}$ results in a saturation time $t_{sat}$ equal to one.

Situations where $t_{sat} > 1$ are thus indicative that the purge time $t_P$ should be decreased, while situations where $t_{sat} < 1$ are indicative that the purge time $t_P$ should be increased. This forms the basis by which the invention provides a closed-loop process for optimizing or correcting purge times for a given fill time. For $t_{sat} > t_{sat_{ref}}$, a metric for $t_{sat}$ involves direct measurement of the time that the oxygen sensor voltage exceeds $V_{ref}$ by PCM 24. For $t_{sat} < t_{sat_{ref}}$, the PCM 24 uses the relationship shown in FIG. 7 to provide a smooth continuation to the metric of FIG. 5 by linearly extrapolating the saturation time from $t_{sat} = t_{sat_{ref}}$ to $t_{sat} = 0$, making $t_{sat}$ proportional to the peak sensor voltage $V_P$.

Figure 8:
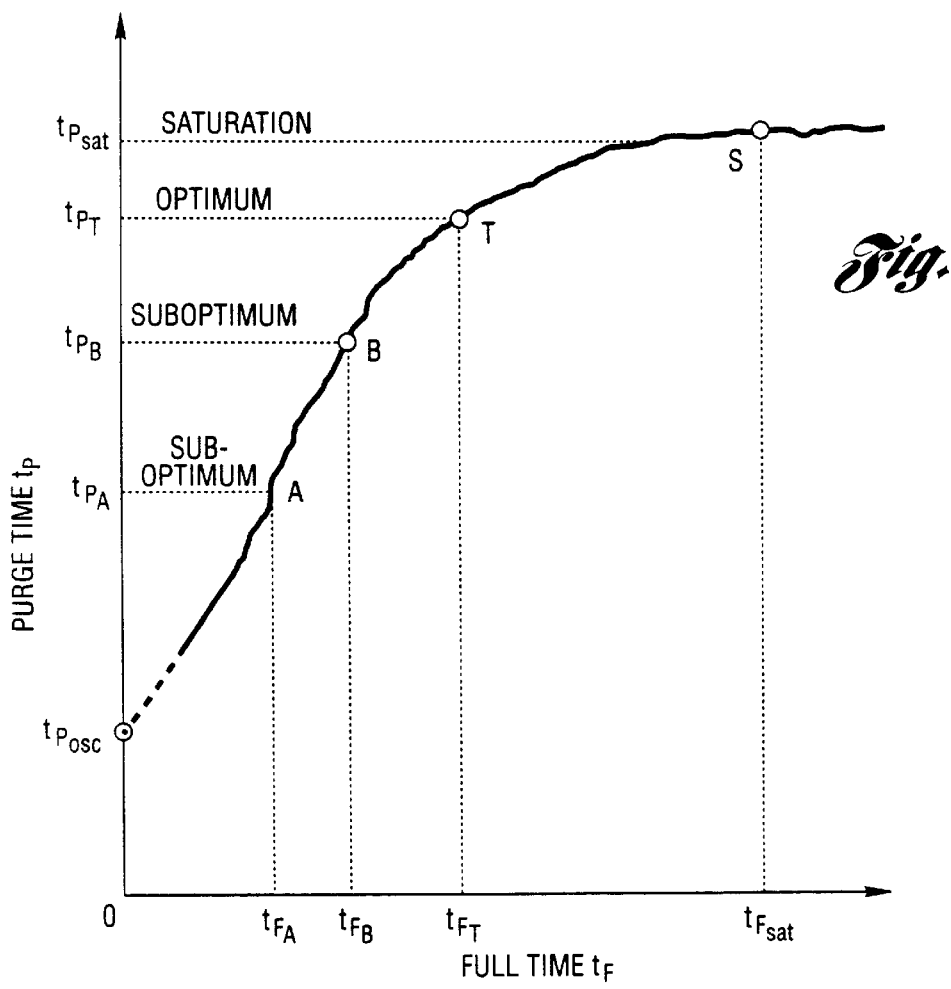
FIG. 8 shows a plot of purge time $t_P$ verse device fill time $t_F$, including points for saturation and sub-optimal points A and B.

FIG. 8 shows the nominal relationship between purge time $t_P$ and fill time $t_F$ for a given operating condition of the engine and a given condition of the downstream device 18. This relationship holds for an approximately constant saturation $t_{sat}$. The purge time $t_P$ monotonically increases with the fill time $t_F$ but reaches saturation when the capacity of the device 18 is equaled or exceeded. A purge time $t_P$ which simultaneously maximizes the storage of $NO_x$ in the device 18, minimizes CO tailpipe emissions during purging, and optimizes the fill time $t_F$ is designated as optimized purge time $t_{PT}$. The optimized purge time $t_{PT}$ corresponds to an optimized fill time $t_{FT}$. Normal purge-time optimization is periodically performed in accordance with the routine of FIG. 15 and, as described below, generates the learned adaptive values K(i,j) for each cell. These adaptive values are subsequently used during normal open-loop fill and purge control as noted above.

Figure 15:
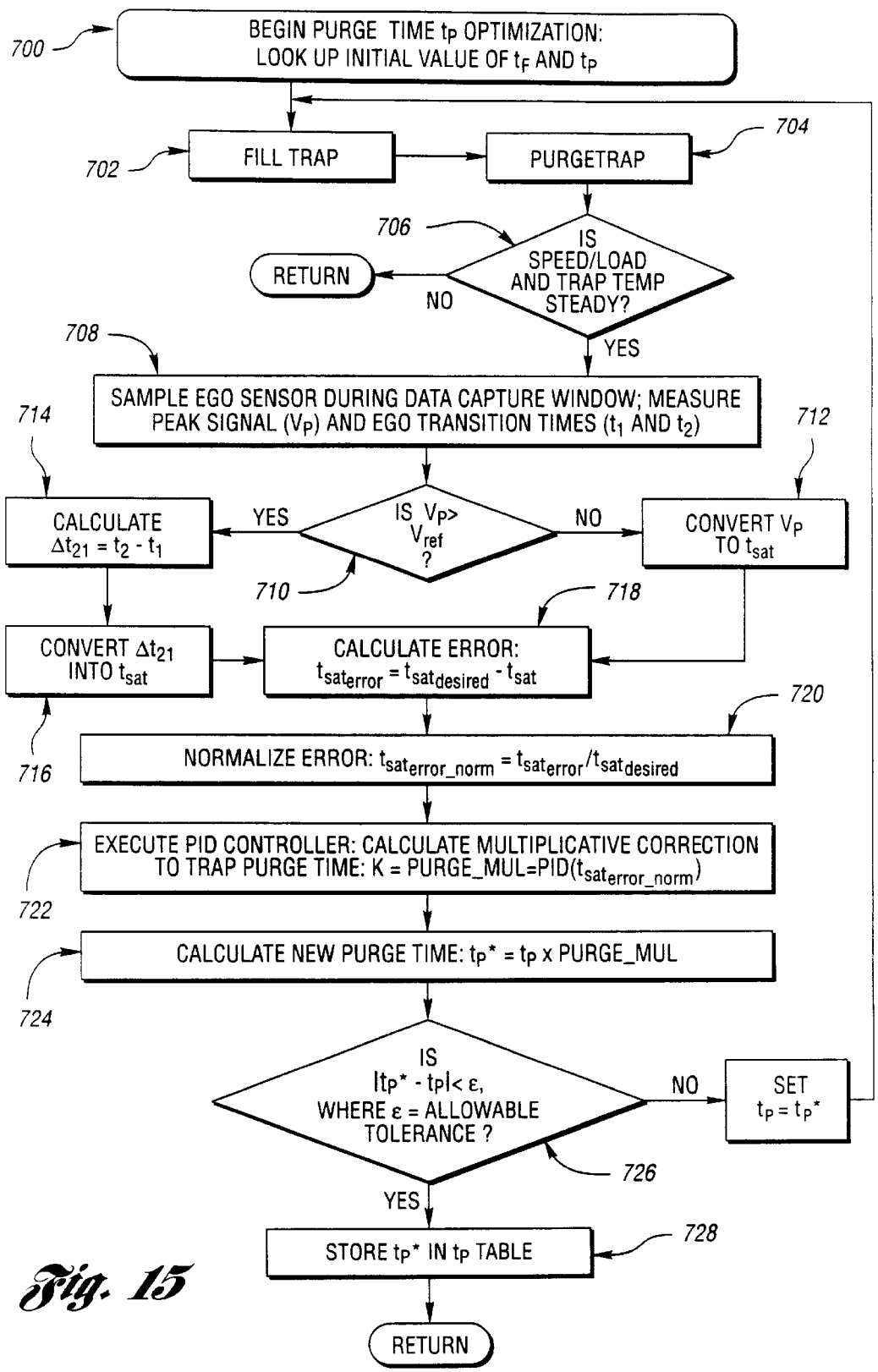
FIG. 15 is a flowchart showing a normal purge time optimization routine in accordance with the invention.

Referring now to FIG. 15, the optimization subroutine for purge time $t_P$ executed at block 102 of FIG. 9 is illustrated in further detail. As noted previously, this subroutine optimizes the air-fuel ratio rich purge spike for a given value of fill time $t_F$. First, as denoted at block 700, initial values for fill time $t_F$ and purge time $t_P$ are retrieved from corresponding lookup tables. These values are either nominal values or previously learned values $t_F^*$ and $t_P^*$, depending on the current operating cell or state of the vehicle engine. The downstream device 18 is then filled and purged at blocks 702 and 704 according to the retrieved values.

At block 706, the PCM determines wether steady state speed/load conditions were present during the fill/purge events of blocks 702 and 704. If steady state conditions were not present, the routine exits the optimization routine. However, if steady state conditions were present, the routine samples the downstream oxygen sensor output during the data sample window as indicated at block 708. As noted previously, the window is timed relative to the device purge event so as to capture the change in the downstream oxygen sensor output as shown in FIG. 4(b).

The peak voltage $V_P$ of the sensor is then determined and compared to $V_{ref}$ at block 710. If the peak sensor voltage $V_P$ is greater than the reference voltage $V_{ref}$, the incremental time $\Delta t_{21}$ spent above the reference voltage $V_{ref}$ is measured at block 714, and a conversion is made to a saturation time $t_{sat}$ proportional to $\Delta t_{21}$ at block 716. On the other hand, if the peak sensor voltage $V_P$ is less than the reference voltage $V_{ref}$, the saturation time $t_{sat}$ is determined at block 712 from the linearly extrapolated function where $t_{sat}$ is proportional to $V_P$. Using this metric provides a smooth transition from $V_P<V_{ref}$ to $V_P=V_{ref}$.

A saturation time error $t_{sat_{error}}$ for the actual saturation time $t_{sat}$ relative to an optimal or desired value $t_{sat_{desired}}$ (the target value for the metric which optimizes the system in terms of minimum CO, HC and NO$_x$ emissions, which may preferably vary as a function of engine operating parameters such as engine speed, engine load, and device temperature) is calculated by subtracting the actual device saturation time $t_{sat}$ from the desired value as shown in block 718. The saturation time error $t_{sat_{error}}$ is then normalized as shown in block 720, and used as an input to a feedback controller, such as a PID (proportional differential integral) algorithm at block 722. The output of the PID controller generates a multiplicative correction factor PURGE_MUL which is then stored as a new adaptive value K(i,j) in the associated lookup cell. The PCM uses the adaptive value K as indicated at block 724 to adapt the purge time $t_P$ in subsequent open-loop cycles to provide optimized "learned" purge times $t_P^*(i,j)$ for given fill times $t_F(i,j)$. In addition, these same adaptive values K are used to adapt the stored fill times $t_F(i,j)$ to generate "learned" fill time values $t_F^*(i,j)$ which correspond to the adapted purge time values. These learned values are stored in a corresponding lookup table. Alternatively, instead of changing the purge time $t_P$, the strength of the purge, i.e., the air-fuel ratio of the air-fuel mixture employed during the purge event (as shown in FIG. 4), can be adjusted in a similar manner.

In further accordance with the invention, learned values for actual NO$_x$ purge time $t_{P_{NOx}}^*$ are obtained after learning both the values for total purge time $t_P^*$ for a given cell, and the purge time $t_{P_{osc}}^*$ related to the quantity of oxygen stored in the downstream device 18. More specifically, to determine $t_{P_{NOx}}^*$, a current saturation value $t_{sat}^*$, i.e., the value corresponding to point S on the "flat" portion of the purge time $t_P$ versus fill time $t_F$ function response of FIG. 8, is determined in accordance with the routine shown in FIG. 10. As denoted at block 200, initial values for a fill time $t_{F_{sat}}$ and a purge time $t_{P_{sat}}$ are retrieved from a lookup table. These initial values are selected to ensure a longer than normal fill and purge time. The downstream device 18 is then filled and purged at blocks 202 and 204 in accordance with the retrieved initial values.

At block 206, the processor determines whether steady state speed/load conditions were present during the fill/purge events of blocks 202 and 204. If steady state conditions were not present, the routine simply returns to normal device control. However, if steady state conditions were present, the routine samples the downstream oxygen sensor output during the data sample window as indicated at block 208.

The peak voltage $V_P$ of the sensor is then determined and compared to a reference voltage $V_{ref}$ at block 210. If $V_P>V_{ref}$, the incremental time $\Delta t_{12}$ spent above $V_{ref}$ is measured at block 214, and a conversion is made to a $t_{sat}$ proportional to $\Delta t_{21}$ at block 216. On the other hand, if $V_P<V_{ref}$, the saturation time $t_{sat}$ is determined at block 212 from the linearly-extrapolated function where $t_{sat}$ is proportional to $V_P$. Using this metric provides a smooth transition from $V_P<V_{ref}$ to $V_P=V_{ref}$.

An error in $t_{sat}$ relative to the desired value $t_{sat}=t_{sat_{desired}}$ is calculated and made equal to $t_{sat_{error}}$ at block 218. The error is then normalized as shown in block 220, and used as an input to a feedback controller, such as a PID (proportional differential integral) algorithm at block 222. The output of the PID controller generates a multiplicative correction factor PURGE_MUL which is used at block 224 to adapt the purge time $t_{Psat}^*$ in subsequent saturation determination cycles. At block 226, it is determined whether $|t_{P_{sat}}^*-tP_{sat}|<\epsilon$, where $\epsilon$ is an allowable tolerance. If not, tPsat is set to tPsat* and another saturation purge is scheduled, and the downstream device 18 is filled at block 202. If $|t_{P_{sat}}^*-t_{P_{sat}}|<\epsilon$, the learned value for $t_{Psat}^*$ is stored in a corresponding lookup table at block 228.

Figure 12:
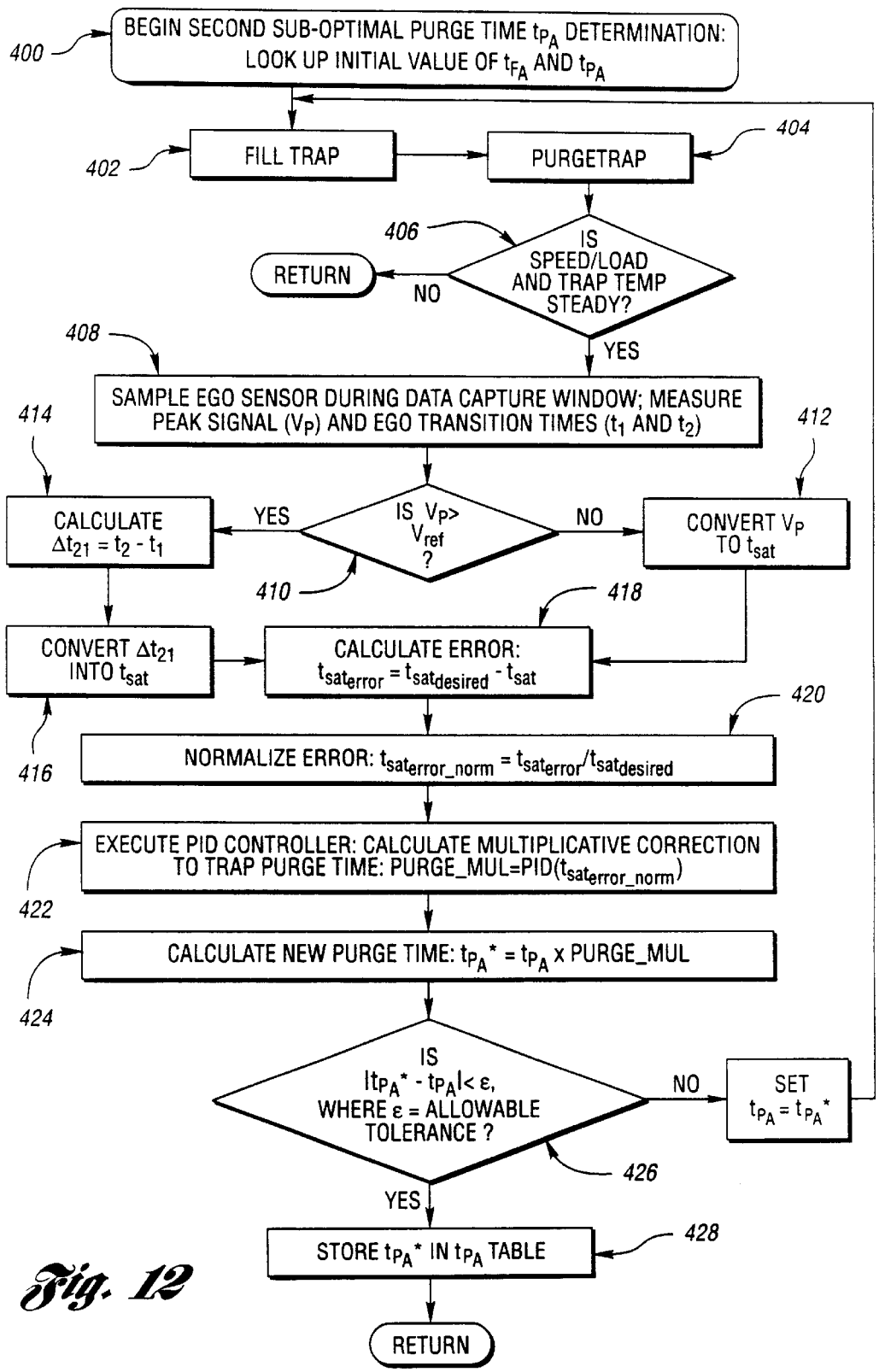
FIG. 12 is a flowchart showing a point A purge time determination routine in accordance with the invention.
Figure 13:
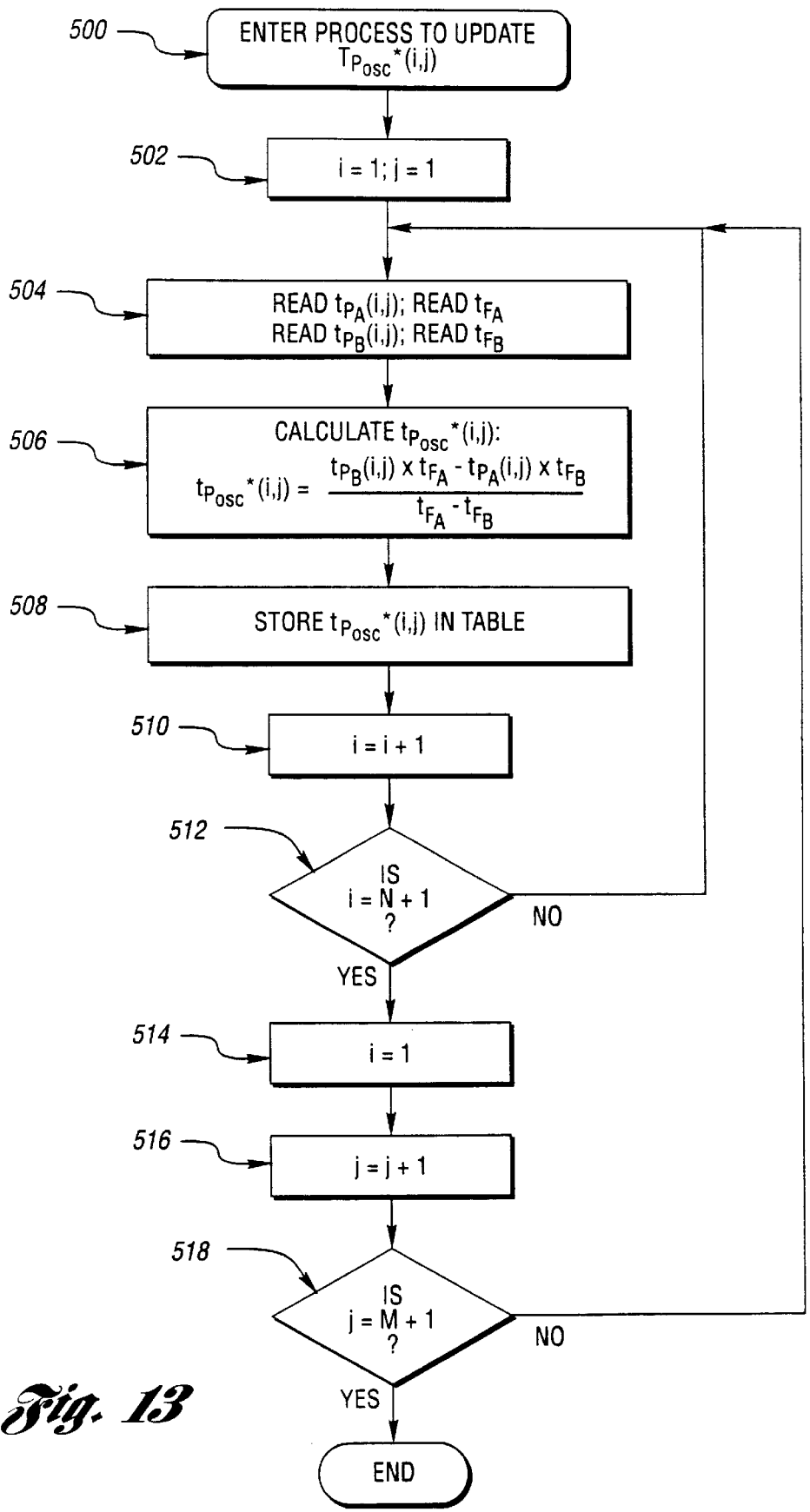
FIG. 13 is a flowchart showing a routine for determining a purge time value representative of oxygen stored in the device.

As shown in FIGS. 11–13, actual values for purge time responsive to stored oxygen ($t_{P_{osc}}^*$) are also obtained through closed-loop control of the purge and fill times. In accordance with the invention, $t_{P_{osc}}^*$ is determined using two sub-optimum fill and purge times corresponding to points A and B in FIG. 8. These points are less than the optimum fill time and are selected to coincide with the proportionally linear portion of the response curve.

More specifically, actual purge times $t_{P_B}^*$ and $t_{P_A}^*$ for point B and point A, respectively, are determined using separate routines similar to that for saturation purge time determination, but using stored fill and purge time values ($t_F$ and $t_P$) corresponding to points A and B. The specific steps are shown as blocks 300–328 in FIG. 11 for point B, and blocks 400–428 in FIG. 12 for point A.

As shown in FIG. 13, the updating process for purge time corresponding to stored oxygen ($t_{P_{osc}}^*$) is obtained by initially setting cell values i and j to 1 at block 500, and retrieving the stored values for $t_{P_A}^*(i,j)$, $t_{F_A}$, $t_{P_B}(i,j)$ and $t_{F_B}$ at block 502.

An updated value is determined at block 504 in accordance with the following:

$$t_{P_{osc}}^*(i,j) = \frac{t_{P_B}^*(i,j) \times t_{F_B} - t_{P_A}^*(i,j) \times t_{F_A}}{t_{F_A} - t_{F_B}}.$$

The values for $t_{P_{osc}}^*$ are stored in a corresponding lookup table as indicated at block 506. As denoted by blocks 508–516, the entire table is stepped through to update all cell values.

Figure 14:
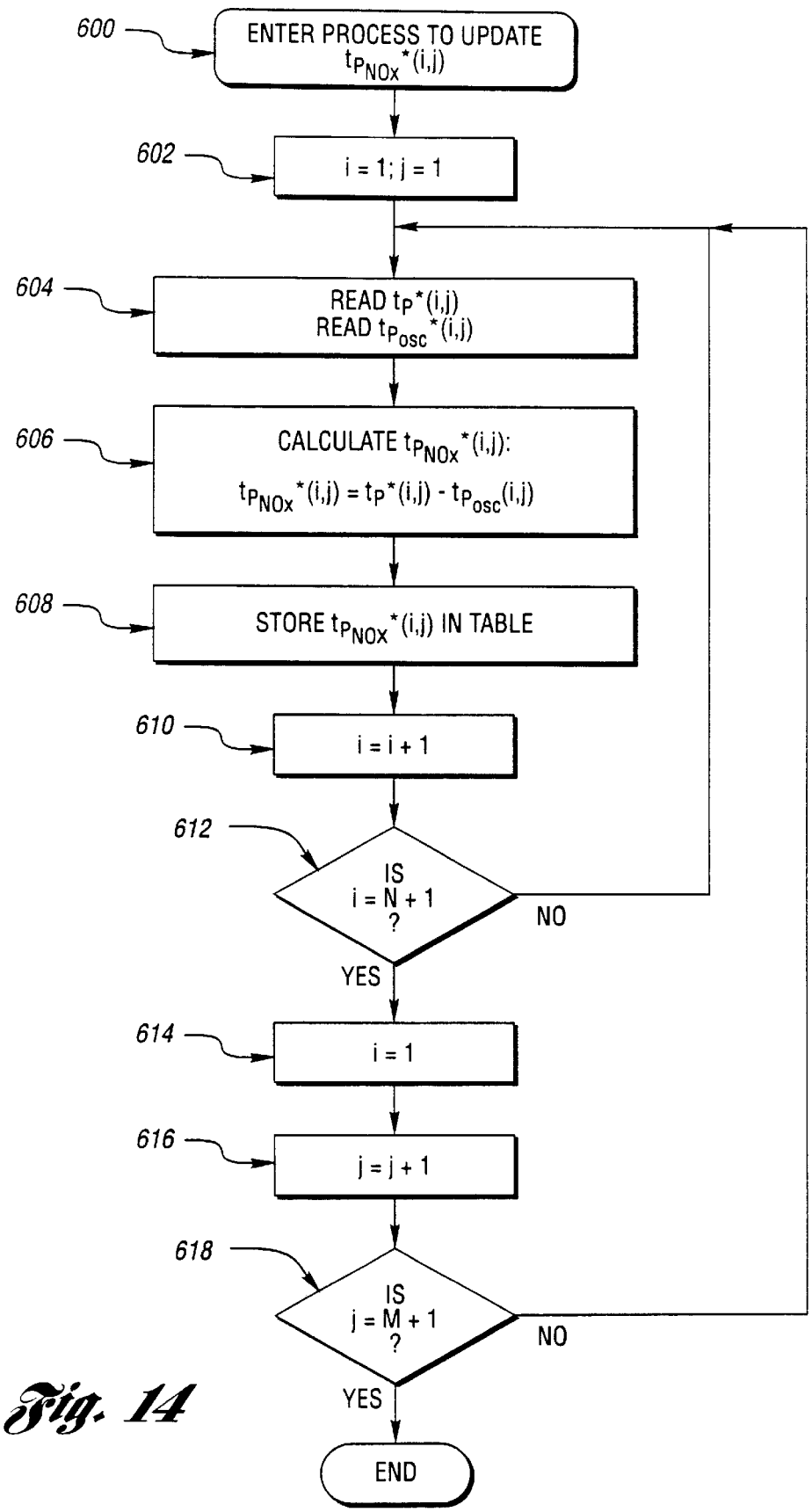
FIG. 14 is a flowchart showing a routine for determining a purge time value representative of $NO_x$ stored in the device.

As shown in FIG. 14, the current values of $t_{P_{osc}}^*(i,j)$, together with the current values of $t_P^*(i,j)$, are used to update the values for NO$_x$ purge time $t_{P_{NOx}}^*(i,j)$. Initially, i and j are set to 1 at block 602, and the values for $t_{P_{osc}}*(i,j)$ and $t_P*(i,j)$ are retrieved from memory at block 604. At block 606 the current value for $t_{P_{NOx}}*(i,j)$ is determined as $t_{P_{NOx}}*(i,j)=t_P*(i,j)-t_{P_{osc}}*(i,j)$. The updated value for $t_{P_{NOx}}*(i,j)$ is then stored in the lookup table. Each cell of the lookup table is updated in this manner as denoted in blocks 610–618.

In further accordance with the invention, current values of $t_{P_{NOx}}*(i,j)$ can be compared with the initial values $t_{P_{NOx}}(i,j)$ to assess the degree of device deterioration. That is, if $t_{P_{NOx}}*(i,j)<t_{P_{NOx}}(i,j)-\alpha$, where $\alpha$ is a predefined constant, then the $NO_x$ storage capacity of the downstream device 18 has deteriorated, HC and CO emissions have increased, and a desulfation or "de-$SO_x$" event is scheduled. In addition, $t_{P_{osc}}*(i,j)$ can be compared to $t_{P_{osc}}(i,j)$, and the driver notified via a warning circuit that servicing is required if there is a difference greater than a predetermined tolerance value.

Thus, the invention advantageously provides a method and system which accurately discriminates the condition or "health" of the downstream device 18 to provide real-time feedback loop control of device fill time, purge time, and strength of purge, during engine operation in a vehicle. The invention therefore allows a catalytic emission control device to be continuously operated at optimum efficiency.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for controlling a purge time cycle and a fill time cycle of an emission control device that receives exhaust gas generated by an internal combustion engine, wherein the device is filled with a constituent gas of the exhaust gas during a first engine operating condition and is purged of constituent gas during a second engine operating condition, the method comprising:
   selecting, in a normal open-loop mode of operation, a fill time and a purge time from a set of predetermined values as a function of an engine operating condition;
   cyclically filling and purging the device based on the selected fill and purge times;
   after a predetermined number of fill and purge cycles, determining a first value representative of current total device capacity, and a second value representative of a quantity of oxygen stored in the device;
   updating at least one of the predetermined values as a function of the first and second values; and
   periodically optimizing a selected purge time associated with a selected fill time by:
   filling the device for the selected fill time;
   purging the device for the selected purge time;
   generating a third value representative of oxygen concentration present in the exhaust flowing through the device during a predetermined sampling period which includes at least an end portion of the purge time;
   comparing the third value to a predetermined reference value, wherein the reference value is based on an optimized value for device capacity utilization; and
   generating an adaption value for modifying the selected purge time as a function of any error between the third value and the reference value.

2. The method of claim 1, wherein generating the third value includes positioning a first oxygen sensor in the engine exhaust system so as to provide an output voltage representative of the oxygen concentration.

3. The method of claim 1, wherein the adaption value is generated as a function of either the generated third value if the third value is not greater than the reference value, and the adaption value is generated as a function of a length of time that the third value exceeds the reference value if the third value exceeds the reference value.

4. The method of claim 3, wherein generating the adaption value further includes linearly extrapolating the third value in proportion to the measured oxygen level when the generated value is below the reference value.

5. The method of claim 1, wherein the selected purge time is optimized only upon operation of the engine at an operating point corresponding to a limited number of engine operating conditions.

6. A method for controlling a purge time cycle and a fill time cycle of an emission control device that receives exhaust gas generated by an internal combustion engine, wherein the device is filled with a constituent gas of the exhaust gas during a first engine operating condition and is purged of constituent gas during a second engine operating condition, the method comprising:
   selecting, in a normal open-loop mode of operation, a fill time and a purge time from a set of predetermined values as a function of an engine operating condition;
   cyclically filling and purging the device based on the selected fill and purge times;
   after a predetermined number of fill and purge cycles, determining a first value representative of current total device capacity, and a second value representative of a quantity of oxygen stored in the device; and
   updating at least one of the predetermined values as a function of the first and second values, wherein determining the first value representative of current total device capacity includes:
   filling the device to a saturation levels;
   generating a fourth value representative of an oxygen concentration present in the exhaust flowing through the device;
   generating a first error value as a function of the fourth value and a predetermined reference value; and
   determining an actual purge time necessary to purge the device when the device is filled to the saturation level using the first error value.

7. A method for controlling a purge time cycle and a fill time cycle of an emission control device that receives exhaust gas generated by an internal combustion engine, wherein the device is filled with a constituent gas of the exhaust gas during a first engine operating condition and is purged of constituent gas during a second engine operating condition, the method comprising:
   selecting, in a normal open-loop mode of operation, a fill time and a purge time from a set of predetermined values as a function of an engine operating condition;
   cyclically filling and purging the device based on the selected fill and purge times;
   after a predetermined number of fill and purge cycles, determining a first value representative of current total device capacity, and a second value representative of a quantity of oxygen stored in the device; and
   updating at least one of the predetermined values as a function of the first and second values, wherein determining the second value includes:
   in sequence, partially filling and purging the device to a first sub-optimal level and a second sub-optimal level over different time periods; and for the first sub-optimal filling and purging, generating a fifth value representative of the oxygen concentration in the exhaust passing through the device;

for the second sub-optimal filling and purging, generating a sixth value representative of the oxygen concentration in the exhaust passing through the device;

generating a second and third error value as a function of the fifth and sixth values, respectively, and a predetermined reference value;

determining an actual purge time necessary to purge the device for each sub-optimal fill time based on the second and third error values, respectively; determining the second value as a function of the sub-optimal fill times and the actual purge times.

8. A system for controlling a purge time cycle and a fill time cycle of an emission control device that receives exhaust gas generated by an internal combustion engine, wherein the device is filled with a constituent gas of the exhaust gas during a first engine operating condition and is purged of constituent gas during a second engine operating condition, the system comprising;

an oxygen sensor positioned relative to the device to provide an output signal representative of a concentration of oxygen present in the exhaust flowing through the device during a sampling period; and a control module including a microprocessor arranged to operate in a normal open-loop mode of operation by determining fill times and purge times based on engine operating conditions and corresponding values stored in a memory, wherein the control module is further arranged to periodically optimize a purge time associated with a selected fill time, determine that a predetermined number of fill and purge cycles have been performed, and in response, determining a first value representative of current total device capacity, and a second value representative of a quantity of oxygen stored in the device to update at least one purge time value as a function of the first and second values, wherein the processor is arranged to determine the first value by filling and purging the device to saturation, generate an error signal responsive to the sensor output signal as a function of the detected output signal and a predetermined reference value, and determine an actual purge time necessary to purge the saturated device of all $NO_x$.

9. The system of claim 8, wherein the processor is arranged to determine the second value by filling and purging the device to a first sub-optimal level of capacity and a second sub-optimal level of capacity over different time periods, and for each sub-optimal filling and purging, generate an error signal responsive to the sensor output signal as a function of the detected output signal and a predetermined reference value, and determine an actual purge time necessary to purge the device for the given sub-optimal fill time, wherein the second value is determined as a function of the fill times and corresponding actual purge times of the first and second sub-optimal capacity levels.

10. The system of claim 8, wherein the oxygen sensor comprises a HEGO type sensor.

* * * * *